US012656790B2

(12) United States Patent
Ryu et al.

(10) Patent No.: US 12,656,790 B2
(45) Date of Patent: Jun. 16, 2026

(54) ELECTRONIC DEVICE AND CONTROL METHOD THEREOF

(71) Applicants: Hyundai Motor Company, Seoul (KR); Kia Corporation, Seoul (KR)

(72) Inventors: Jung Min Ryu, Hwaseong-si (KR); Seok Won Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 167 days.

(21) Appl. No.: 18/654,501

(22) Filed: May 3, 2024

(65) Prior Publication Data

US 2025/0189991 A1 Jun. 12, 2025

(30) Foreign Application Priority Data

Dec. 11, 2023 (KR) ........................ 10-2023-0179092

(51) Int. Cl.
G05D 1/698 (2024.01)
(52) U.S. Cl.
CPC .................................. G05D 1/6987 (2024.01)
(58) Field of Classification Search
CPC ............................. G05D 1/646; G05D 1/1246
USPC ........................................................ 701/25
See application file for complete search history.

(56) References Cited

U.S. PATENT DOCUMENTS

| | | | |
|---|---|---|---|
| 10,223,916 B2 | 3/2019 | Song et al. | |
| 10,852,745 B2 | 12/2020 | Jeon et al. | |
| 12,433,508 B2 * | 10/2025 | Harris ................... | G16H 40/63 |

| | | | |
|---|---|---|---|
| 2017/0017236 A1 | 1/2017 | Song et al. | |
| 2018/0299882 A1 * | 10/2018 | Kichkaylo ........... | G05D 1/0289 |
| 2019/0018427 A1 * | 1/2019 | Jeon ..................... | G05D 1/0011 |
| 2020/0233435 A1 * | 7/2020 | Kichkaylo ....... | G05B 19/41895 |
| 2021/0323800 A1 * | 10/2021 | Liu ...................... | B65G 1/1378 |
| 2022/0048186 A1 * | 2/2022 | Sharma .............. | G06F 11/3006 |
| 2022/0234872 A1 * | 7/2022 | Sharma .............. | G01C 21/206 |
| 2022/0269273 A1 | 8/2022 | Choi et al. | |
| 2024/0111585 A1 * | 4/2024 | Melchior ............. | G06F 9/5027 |
| 2025/0076892 A1 * | 3/2025 | Kikkawa ............... | G05D 1/644 |

FOREIGN PATENT DOCUMENTS

| | | |
|---|---|---|
| JP | 2022128579 A | 9/2022 |
| KR | 101695557 B1 | 1/2017 |
| KR | 20190008709 A | 1/2019 |

\* cited by examiner

*Primary Examiner* — Yazan A Soofi
(74) *Attorney, Agent, or Firm* — Slater Matsil, LLP

(57) ABSTRACT

An electronic device can include a communication device, one or more processors and a storage medium storing computer-readable instructions that enable the one or more processors to set a first sub area in which a first robot is movable in a first direction and in which a second robot is movable in a second direction, where the first sub area includes a first partial area of a main area, determine a first entry condition for whether the first robot is permitted to enter the main area, based on a location of the second robot and based on the first robot having entered the first sub area, where the main area is where a deadlock can occur, and transmit a first entry command for causing the first robot to enter the main area to the first robot, based on the first entry condition being determined.

20 Claims, 10 Drawing Sheets

DEVICE
100

PROCESSOR
110

MEMORY
120

INSTRUCTIONS
122

COMMUNICATION DEVICE
130

700

| id | name | site_id | floor | points | max_robots | enable | triggers | created_at | updated_at |
|----|------|---------|-------|--------|------------|--------|----------|------------|------------|
| 1 | FIFTH FLOOR CENTRAL HALLWAY | 3 | 5 | [[75.267,53.442],[75.533,50.504], [107.667,50.237],[107.8,54.644]] | 1 | true | [ {"points": [ {"x": 0, "y": 0, }, {"x": 0, "y": 10, }, ... | 2023-07-06 12:12:12 | 2023-07-06 13:12:01 |
| 2 | THIRD FLOOR CENTRAL HALLWAY | 1 | 3 | [[131.244,23.894],[131.511,28.167], [108.044,28.034],[108.578,23.894]] | 1 | true | ... | ... | ... |
| 3 | 12-TH FLOOR EASTERN END HALLWAY | 1 | 12 | [[132.383,25.656],[131.983,29.929], [155.583,30.063],[155.85,26.057]] | 2 | true | ... | ... | ... |
| 4 | FIRST FLOOR ROBBY CONGESTION PREVENTION AREA | 2 | 1 | [[109.007,28.922],[108.607,24.915], [132.607,25.049],[132.207,28.655]] | 3 | true | ... | ... | ... |

FIG. 7

| ☐ | AREA NAME ↑↓ | Label ID ↑↓ | AREA (FLOOR) ↑↓ | ALLOWED NUMBER ↑↓ OF ROBOTS | purpose ↑↓ |
|---|---|---|---|---|---|
| ☐ | charge1 | charge1 | 1F | 2 | charging |
| ☐ | ready_11 | ready_11 | 1F | 2 | readyPlace |
| ☐ | room_52 | room_52 | 5F | 1 | room |
| ☐ | room_36 | room_36 | 3F | 1 | room |
| ☐ | room_25 | room_25 | 2F | 1 | room |
| ☐ | room_24 | room_24 | 2F | 1 | room |
| ☐ | room_14 | room_14 | 1F | 1 | room |
| ☐ | room_11 | room_11 | 1F | 1 | room |
| ☐ | room_35 | room_35 | 3F | 1 | room |
| ☐ | room_37 | room_37 | 3F | 1 | room |
| ☐ | room_17 | room_17 | 1F | 1 | room |
| ☐ | room_31 | room_31 | 3F | 1 | room |
| ☐ | room_26 | room_26 | 2F | 1 | room |
| ☐ | room_21 | room_21 | 2F | 1 | room |

⇩

REFERENCE INFORMATION

LABEL ID            room_24

LOCATION NAME       room_24

ALLOWED NUMBER
OF ROBOTS           1                ⌃⌄

FLOOR               2F            ⌄   2F

STANDBY SITE        (ROOM 226⊗)(ROOM 227⊗)(ROOM 228⊗)(ROOM 229⊗)
                    (ROOM 230⊗)(ROOM 231⊗)(ROOM 232⊗)

room_226/room_227/room_228/room_229/room_230/room_231/room_232

AREA                2F MAP AREA EDITION

FIG.8

ELECTRONIC DEVICE AND CONTROL METHOD THEREOF

CROSS-REFERENCE TO RELATED APPLICATIONS

This application claims the benefit of Korean Patent Application No. 10-2023-0179092, filed on Dec. 11, 2023, which application is hereby incorporated herein by reference.

TECHNICAL FIELD

The present disclosure relates to an electronic device, and a control method thereof, for managing robots.

BACKGROUND

Robotic systems are widely used in various fields, such as factories, warehouses, and hospitals. However, areas, in which the robots work, often overlap each other or collide with each other. For example, if a plurality of robots perform tasks simultaneously, it is important to set and manage priorities of the tasks. To achieve this, a control server may use a light detection and ranging device (LiDAR) of a robot itself or manage and/or control routes of all of the robots in the server.

In particular, controlling the movement routes of the robots through a separate reading device, such as a LiDAR may cause the movement routes of several robots to overlap each other in hallways and intersections, such as narrow passages whereby several robots may fall into a deadlock state. The control server may manage the routes of the robots collectively in a factory or the like to set the movement routes of the robots as detours, but, in the areas including the detours, a separate standby area that does not interfere with the movement of people while other robots pass first cannot be designated such that the robots may safely stand by.

SUMMARY

The present disclosure relates to an electronic device and a control method thereof, and more specifically, to a technology for managing areas related to cross driving of different types of robots.

Some embodiments of the present disclosure can solve the above-mentioned problems occurring in the prior art while advantages achieved by the prior art are maintained intact.

To solve above-mentioned problems, some embodiments of the present disclosure can determine the entry sequence of robots to a main area, through the main area, a sub area, and a trigger area to manage areas for cross driving of different types of robots.

An embodiment of the present disclosure can provide an electronic device and a control method, by which a sub area including a partial area of a main area, in which a deadlock occurs in an area, in which a first robot that moves in a first direction and a second robot that moves in a second direction that is different from the first direction may move may be set whereby a deadlock may be prevented in the main area while entries of the robots are adjusted if the plurality of robots are located in the sub area even if the plurality of robots are located in the main area.

An embodiment of the present disclosure can provide an electronic device and a control method, by which a first entry condition that is a condition for causing a first robot to enter the main area with respect to a location of a second robot based on that the first robot has entered a sub area may be determined whereby the entry condition may be determined in detail depending on an entry direction of the robot and a safety and a convenience of a pedestrian may be secured by causing the robot to move to a preset safe standby area.

An embodiment of the present disclosure can provide an electronic device and a control method, by which a request of a first robot and a request of a second robot may be received through a communication device that performs a data conversion function and a main area and a sub area are set through a user input whereby data of robots that perform various types of services may be received and an entry sequence of the robots to the main area may be determined through an interaction with the user.

Technical problems solved by some embodiments of the present disclosure are not limited to the aforementioned problems, and solutions to other technical problems not mentioned herein can be clearly understood from the following description by those skilled in the art to which the present disclosure pertains.

According to an embodiment of the present disclosure, an electronic device can include a memory that stores computer-executable instructions, at least one processor that accesses the memory and executes the instructions, and a communication device that supports performance of communication between the electronic device and the external device, and the at least one processor sets a sub area including a partial area of, among areas, in which a first robot being movable in a first direction and a second robot being movable in a second direction being different from the first direction are movable, a main area, in which a deadlock occurs, determines a first entry condition being a condition, in which it is possible for the first robot to enter the main area, with respect to a location of the second robot, based on that the first robot has entered the sub area, and transmits an entry command for causing the first robot to enter the main area to the first robot, based on the determined first entry condition.

In an embodiment, the at least one processor may set the sub area including the partial area of the main area, and a partial area of an area being different from the main area, set an area of the sub area, in which the first robot enters the main area first while moving to the main area, as a first sub area, and set an area of the sub area, in which the second robot enters the main area first while moving to the main area, as a second sub area.

In an embodiment, the at least one processor may identify whether the second robot is located in the main area, based on that the first robot has entered the first sub area, and determine the first entry condition as being inactive, based on that the second robot is located in the main area and on the number of robots being movable to the main area.

In an embodiment, the at least one processor may move the first robot to a standby area being distinguished from the first sub area, the second sub area, and the main area, based on that the first entry condition is determined as being inactive.

In an embodiment, the at least one processor may determine the number of robots located in the main area, based on that the second robot is located in the first sub area while moving in the second direction, and determine the first entry condition as being active, based on that the number of the robots located in the main area is a predetermined number of robots or less.

In an embodiment, the at least one processor may determine a priority of the first robot and a priority of the second robot based on that the second robot is located in an intersection area of the second sub area being a partial area of the main area while moving in the second direction.

In an embodiment, the at least one processor may determine the priority of the first robot in the main area based on at least one of a remaining battery charge of the first robot, a loading state of the first robot, or an operation time period of the first robot, or any combination thereof, determine the priority of the second robot in the main area based on at least one of a remaining battery charge of the second robot, a loading state of the second robot, or an operation time period of the second robot, or any combination thereof, and determine the first entry condition based on comparison of the priority of the first robot and the priority of the second robot.

In an embodiment, the at least one processor may determine a second entry condition being a condition for causing the second robot to enter the main area as being inactive, based on that the priority of the first robot is higher than the priority of the second robot, move the second robot to a standby area distinguished from the first sub area, the second sub area, and the main area, based on that the second entry condition is determined as being inactive, determine the number of robots located in the main area, based on that the first robot is located in the intersection area while moving in the first direction, and determine the second entry condition as being active, based on that the number of the robots located in the main area is a predetermined number of robots or less.

In an embodiment, the at least one processor may set an intersection area of the sub area being a partial area of the main area, set an area of the sub area, other than the partial area of the main area, as a padding area, determine a priority of the first robot and a priority of the second robot, based on that the first robot has entered the intersection area and the second robot has entered the padding area, and determine the first entry condition based on a comparison of the priority of the first robot and the priority of the second robot.

In an embodiment, the at least one processor may receive a request of the first robot and a request of the second robot, through the communication device that performs a data transform function, determine the first direction and the second direction based on locations of the main area and the sub area, and locations of the first robot and the second robot, and set the main area and the sub area based on a user input received through the communication device.

According to an embodiment of the present disclosure, a control method can include setting a sub area including a partial area of, among areas, in which a first robot being movable in a first direction and a second robot being movable in a second direction being different from the first direction are movable, a main area, in which a deadlock occurs, determining a first entry condition being a condition, in which it is possible for the first robot to enter the main area, with respect to a location of the second robot, based on that the first robot has entered the sub area, and transmitting an entry command for causing the first robot to enter the main area to the first robot, based on the determined first entry condition.

In an embodiment, the setting of the sub area may include setting the sub area including the partial area of the main area, and a partial area of an area being different from the main area, setting an area of the sub area, in which the first robot enters the main area first while moving to the main area, as a first sub area, and setting an area of the sub area, in which the second robot enters the main area first while moving to the main area, as a second sub area.

In an embodiment, the determining of the first entry condition may include identifying whether the second robot is located in the main area, based on that the first robot has entered the first sub area, and determining the first entry condition as being inactive, based on that the second robot is located in the main area and on the number of robots being movable to the main area.

In an embodiment, the determining of the first entry condition may include moving the first robot a standby area being distinguished from to the first sub area, the second sub area, and the main area, based on that the first entry condition is determined as being inactive.

In an embodiment, the determining of the first entry condition may include determining the number of robots located in the main area, based on that the second robot is located in the first sub area while moving in the second direction, and determining the first entry condition as being active, based on that the number of the robots located in the main area is a predetermined number of robots or less.

In an embodiment, the determining of the first entry condition may include determining a priority of the first robot and a priority of the second robot based on that the second robot is located in an intersection area of the second sub area being a partial area of the main area while moving in the second direction.

In an embodiment, the determining of the first entry condition may include determining the priority of the first robot in the main area based on at least one of a remaining battery charge of the first robot, a loading state of the first robot, or an operation time period of the first robot, or any combination thereof, determining the priority of the second robot in the main area based on at least one of a remaining battery charge of the second robot, a loading state of the second robot, or an operation time period of the second robot, or any combination thereof, and determining the first entry condition based on comparison of the priority of the first robot and the priority of the second robot.

In an embodiment, the determining of the first entry condition may include determining a second entry condition being a condition for causing the second robot to enter the main area as being inactive, based on that the priority of the first robot is higher than the priority of the second robot, moving the second robot to a standby area distinguished from the first sub area, the second sub area, and the main area, based on that the second entry condition is determined as being inactive, determining the number of robots located in the main area, based on that the first robot is located in the intersection area while moving in the first direction, and determining the second entry condition as being active, based on that the number of the robots located in the main area is a predetermined number of robots or less.

In an embodiment, the control method may further include setting an intersection area of the sub area being a partial area of the main area, setting an area of the sub area, other than the partial area of the main area, as a padding area, determining a priority of the first robot and a priority of the second robot, based on that the first robot has entered the intersection area and the second robot has entered the padding area, and determining the first entry condition based on a comparison of the priority of the first robot and the priority of the second robot.

In an embodiment, the control method may further include receiving a request of the first robot and a request of the second robot, through a communication device that performs a data transform function, determining the first direction and the second direction based on locations of the main area and the sub area, and locations of the first robot and the second robot, and setting the main area and the sub area based on a user input received through the communication device.

BRIEF DESCRIPTION OF THE DRAWINGS

The above and other features and advantages of the present disclosure can be more apparent from the following detailed description taken in conjunction with the accompanying drawings, in which:

FIG. 7 is a table illustrating an example of setting a main area in an electronic device according to an embodiment of the present disclosure;

FIG. 8 is a diagram illustrating interfaces that are provided to a user by an electronic device according to an embodiment of the present disclosure;

In relation to the description of the drawings, identical or similar reference numerals may be used for identical or similar components.

DETAILED DESCRIPTION OF ILLUSTRATIVE EMBODIMENTS

Figure 1:
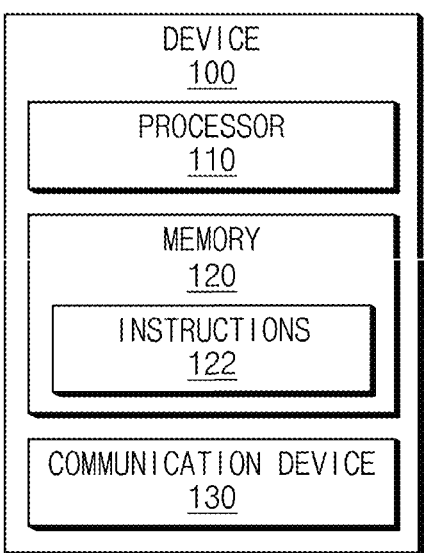
FIG. 1 is a diagram illustrating an electronic device according to an embodiment of the present disclosure.

Hereinafter, some example embodiments of the present disclosure will be described in detail with reference to the accompanying drawings. In adding reference numerals to the components of the drawings, it can be noted that same components can be denoted by same reference numerals even when they are drawn in different drawings. Furthermore, in describing some example embodiments of the present disclosure, when it is determined that a detailed description of related known configurations and functions may hinder understanding of some embodiments of the present disclosure, a detailed description thereof can be omitted. In particular, various example embodiments of the present disclosure will be described with reference to the accompanying drawings. However, it is not intended to necessarily limit the technology described in the present disclosure to specific example embodiments, and can be understood to include various modifications, equivalents, and/or alternatives to the example embodiments of the present disclosure.

In the present disclosure, terms such as "first", "second", "A", "B", "(a)", "(b)", and the like, may be used. Such terms can be merely intended to distinguish one component from another component, and such terms do not necessarily limit the nature, sequence or order of the constituent components. Unless otherwise defined, terms used herein, including technical or scientific terms, can have same meanings as those generally understood by those skilled in the art to which the present disclosure pertains. Such terms as those defined in a generally used dictionary can be interpreted as having meanings equal to the contextual meanings in the relevant field of art, unless clearly defined otherwise in the present application. For example, expressions, such as "a first," "a second," "the first," or "the second," used in the present disclosure can refer to various components in any order and/or importance, and may be only used to distinguish one component from another component and does not necessarily limit the components. For example, a first user device and a second user device may refer to different user devices regardless of order or importance. For example, a first component may be renamed a second component without departing from the scope of rights described in the present disclosure, and similarly, a second component may also be renamed a first component.

In the present disclosure, expressions, such as "have," "may have," "includes," or "may include" indicate the presence of the corresponding feature (e.g., a numerical value, a function, an operation, or a component such as a part), and does not rule out the presence of additional features.

When it is mentioned that a component (e.g., a first component) is "(operatively or communicatively) coupled with/to" or "connected" to another component (e.g., a second component), it can be understood that the certain component may be connected directly to the other component or may be connected through another component (e.g., a third component). On the other hand, when it is mentioned that a component (e.g., a first component) is "directly connected" or "directly electrically connected" to another component (e.g., a second component), it may be understood that there is no component (e.g., a third component) between the component and the other component.

The expression "configured to" used in the present disclosure may be used as, depending on the context, for example, "suitable for," "having the capacity to", "designed to," "adapted to," "made to," or "capable of."

The term "configured (or set to)" may not necessarily mean "specifically designed to" in hardware. Instead, in some situations, the expression "device configured to" may mean that the device is "capable of" working with other devices or components. For example, the phrase "processor configured (or set) to perform A, B, and C" may refer to a processor dedicated to performing the operations (e.g., an embedded processor) or a general-purpose processor (e.g., a CPU or an application processor) capable of performing the corresponding operations by executing one or more software programs stored on a memory device. Terms used in the present disclosure can be merely used to describe specific example embodiments and may not be intended to necessarily limit the scope of other embodiments. Singular expressions may include plural expressions, and vice versa, unless the context clearly indicates otherwise. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application. In some cases, even terms defined in the present disclosure may not be interpreted to exclude other embodiments of the present disclosure.

In the present disclosure, expressions, such as "A or B," "at least one of A or/and B," or "one or more of A or/and B", may include all possible combinations of the items listed together. For example, "A or B," "at least one of A and B," or "at least one of A or B" (1) may include at least one A, (2) may include at least one B, or (3) may refer to all cases including both at least one A and at least one B. Additionally, in describing the components of the embodiments of the present disclosure, the phrase, such as "A or B", "at least one of A and B", "at least one of A or B", "A, B or C", "A, B, and C," "at least one of A, B, or C," and "at least one of A, B, C, or any combination thereof," may include any one of the items listed together, or any possible combination of them. In particular, phrases, such as "at least one of A, B, or C, or any combination thereof", may include A or B or C or a combination thereof such as AB or ABC.

Hereinafter, some example embodiments of the present disclosure will be described in detail with reference to FIGS. 1 to 10.

FIG. 1 is a view illustrating an electronic device according to an embodiment of the present disclosure.

An electronic device 100 according to an embodiment may include a processor 110, a memory 120 including instructions 122, and a communication device 130, any combination of or all of which may be in plural or may include plural components thereof.

The electronic device 100 may refer to a device that determines an entry condition of a robot. For example, if a plurality of robots move through a main area, the electronic device 100 may determine an entry condition that is a condition for causing the plurality of robots to enter the main area. In detail, the main area may refer to, among areas in which the plurality of robots may move, an area, in which a deadlock between the plurality of robots may occur. Here, the deadlock may include a state, in which two or more robots are waiting for the tasks of the other robots to finish, and thus, nothing has been completed consequently. For example, while a first robot moves to perform a first function in the main area, the first function may be interrupted by a second robot that moves to perform a second function in the main area. In this way, the electronic device 100 may determine the entry conditions of the respective robots to prevent deadlocks of the first robot and the second robot. For reference, in the specification, for convenience of description, the first robot and the second robot are illustrated in the main area.

The electronic device 100 may determine whether the second robot is located in the main area if, among the plurality of robots, at least one first robot enters the main area. The electronic device 100 may set the entry condition of the first robot to an inactive state if the second robot is located in the main area. The electronic device 100 may determine the entry condition of the first robot if the second robot deviates from the main area. A detailed description of a method of determining the entry condition of the first robot by the electronic device 100 will be described later relating to FIGS. 4 to 6 below.

The processor 110 may execute software and control at least one other component (e.g., a hardware or software component) connected to the processor 110. In addition, the processor 110 also may perform various data processing or operations. For example, the processor 110 may store a main area, a sub area, and a standby area in the memory 120.

For reference, the processor 110 may perform all operations that are performed by the electronic device 100. Accordingly, for convenience of description, in the specification, the operations performed by the electronic device 100 will be mainly described as operations that are performed by the processor 110. Furthermore, in the specification, for convenience of description, the processor 110 will be mainly described as a single processor, but the present disclosure is not limited thereto. For example, the electronic device 100 may include at least one processor. Each of the at least one processor may perform all operations related to an operation of determining the entry condition of the robot.

The memory 120 may temporarily and/or permanently store various data and/or information required to perform an operation of determining the entry condition of the robot. For example, the memory 120 may store the main area, the sub area, and the standby area.

The communication device 130 may support communication between the electronic device 100 and an external device. For example, the communication device 130 may include one or more components that allow communication between the electronic device 100 and the external device. For example, the communication device 130 may include a short range wireless communication unit, a microphone, and the like. Then, the short range communication technologies can include wireless LAN (Wi-Fi), Bluetooth, ZigBee, Wi-Fi Direct (WFD), ultra-wideband (UWB), infrared Data Association (IrDA), Bluetooth Low Energy (BLE), or near field communication (NFC), for example, but the present disclosure is not limited thereto.

Figure 2:
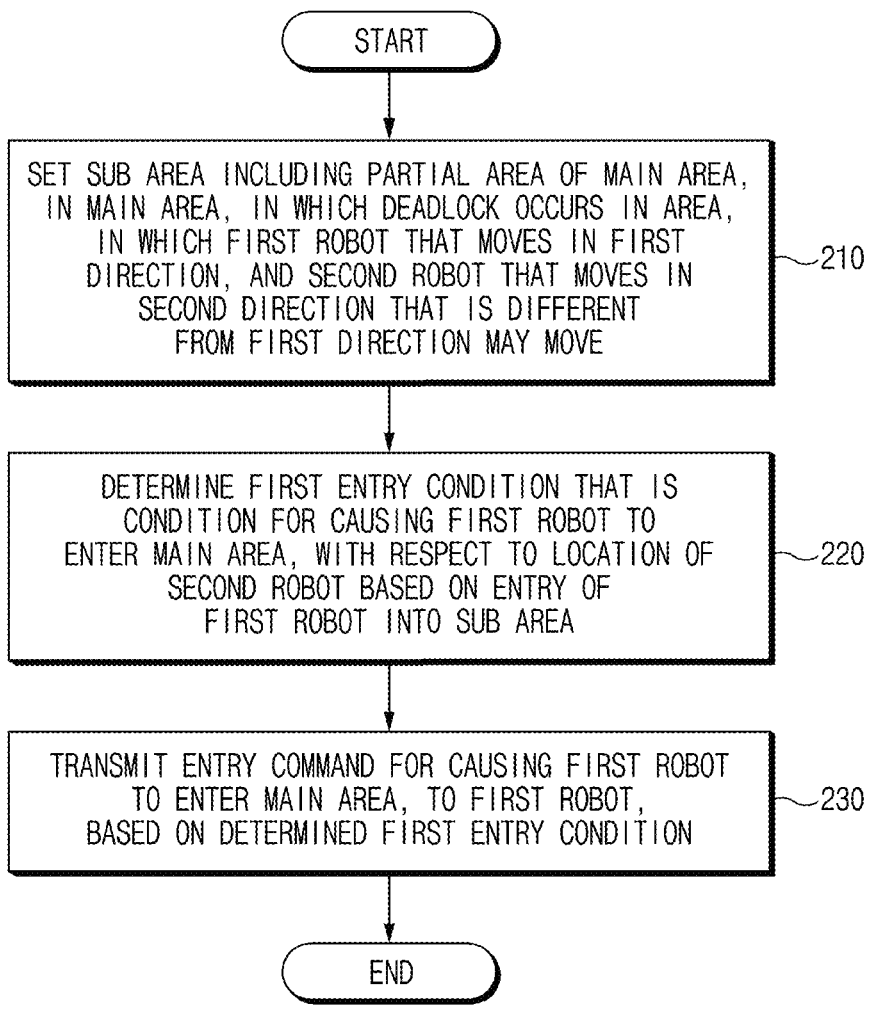
FIG. 2 is a flowchart illustrating a control method in an electronic device according to an embodiment of the present disclosure.

FIG. 2 is a flowchart illustrating a control method in an electronic device according to an embodiment of the present disclosure.

An electronic device (e.g., the electronic device 100 in FIG. 1) according to an embodiment, in operation 210, may set a sub area including a partial area of the main area, in the main area, in which a deadlock occurs in a secondary area, in which the first robot that moves in a first direction, and the second robot that moves in a second direction that is different from the first direction may move. For example, the sub area may include a partial area of the main area and a partial area of a secondary area that is different from the main area (e.g., the secondary being some area other than the main area). To prevent a deadlock of the first robot and the second robot in the main area, the electronic device may determine an entry sequence of the robot that has entered the sub area depending on the robot located in the main area if the robot (e.g., the first robot or the second robot) has entered the sub area.

In operation 220, the electronic device may determine a first entry condition that is a condition for causing the first robot to enter the main area, with respect to the location of the second robot based on the entry of the first robot into the sub area. For example, the first entry condition may include a condition for causing the first robot to enter the main area. The second entry condition may include a condition for causing the second robot to enter the main area. The electronic device may compare the first entry condition and the second entry condition. The electronic device may determine which robot may enter the main area, based on the results of the performed comparison. In the specification, for convenience of description, the first robot will be described as a robot that is about to enter the main area, and the second robot will be described as a robot that is located in at least one of the main area or the sub area, or any combination thereof.

In operation 230, the electronic device may transmit an entry command for causing the first robot to enter the main area, to the first robot, based on the determined first entry condition. However, the command transmitted from the electronic device to the first robot is not limited thereto. For example, the electronic device may transmit a standby command for causing the first robot to move to a standby area, to the first robot, based on the first entry condition. A detailed description related to this will be described later relating to FIGS. 4 to 6 below.

Figure 3:
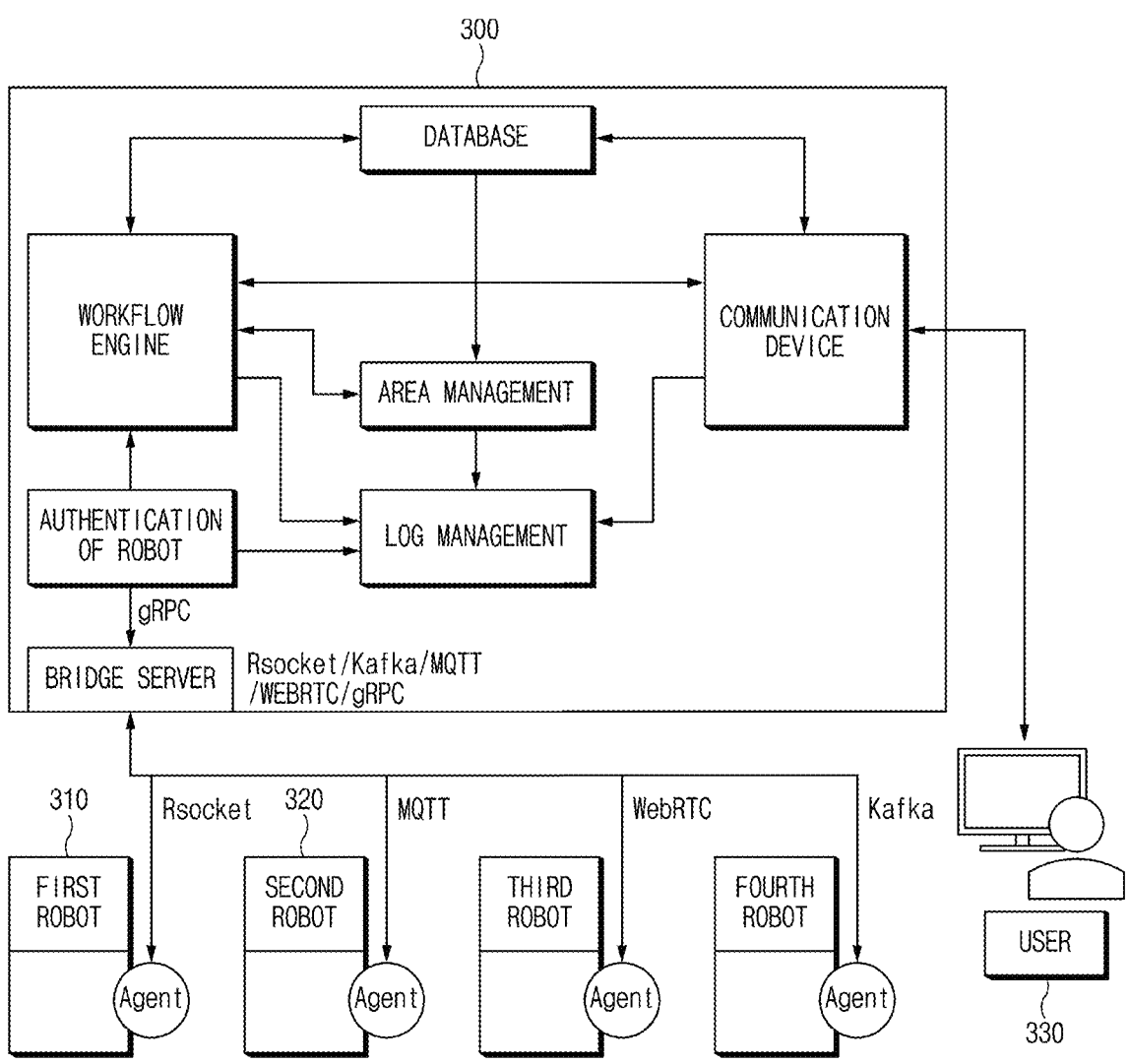
FIG. 3 is a diagram illustrating a function of an electronic device and a connection relationship between the electronic device and a robot in an electronic device according to an embodiment of the present disclosure.

FIG. 3 is a diagram illustrating a function of the electronic device and an example connection relationship between the electronic device and the robot, in an electronic device according to an embodiment of the present disclosure.

An electronic device 300 according to an embodiment may include a workflow engine, a database, and a communication device. For example, the workflow engine may refer to an engine that executes a scenario that is provided for a robot. By way of example, the workflow engine may include at least one of a delivery-related scenario, a patrol-related scenario, a guidance service-related scenario, or any combination thereof.

The electronic device 300 may receive requests from the plurality of robots through a bridge server. For example, the bridge server may refer to a server that receives different types of data, converts them into one type, and outputs the converted data. The electronic device 300 may receive requests from a first robot 310 and a second robot 320 through the bridge server. The electronic device 300 may receive data that use multiple communication protocols (e.g., Rsocket, Kafka, MQTT, WebRTC, and gRPC), through the bridge server.

By way of example, the request of the robot may include a request for enabling of an entry condition for causing the robot to enter the main area. For reference, in FIG. 3, for convenience of description, the robots that transmit requests to the electronic device 300 will be described as the first robot 310 and the second robot 320, but the present disclosure is not limited thereto, and a third robot and a fourth robot, or any number of robots, also may transmit requests to the electronic device 300.

By way of example, if the electronic device 300 receives a request from the first robot 310 through the bridge server, the electronic device 300 may perform a robot authentication. The electronic device 300 may increase a security by identifying the requests from unauthorized robots.

The electronic device 300 may perform an area management function based on the first robot 310 being an authenticated robot. For example, the area management function may include a function of processing a request from the first robot by comparing current locations of the robots that communicate with the electronic device 300 with a location of the main area. The electronic device 300 may receive a request from the first robot 310 and perform the following operations based on the first robot 310 being an authenticated robot. In detail, if the first robot 310 enters the main area, or if the first robot transmits a request to the electronic device 300 to enter the main area, the electronic device 300 may determine whether the second robot 320 is located in the main area. The electronic device 300 may set the entry condition of the first robot 310 to an inactive state if the second robot 320 is located in the main area. The electronic device 300 may determine the entry condition of the first robot 310 if the second robot 320 deviates from the main area. A detailed description of a method for determining the entry condition of the first robot 310 by the electronic device 300 will be described later relating to FIGS. 4 to 6 below.

The electronic device 300 may receive an input from a user 330 through the communication device. For example, the electronic device 300 may set the main area and the sub area based on the input received from the user 330. The input by the user 330 may include at least one of locations of areas (e.g., including the main area and the sub area), sizes of the areas, or a size of a secondary area, in which the sub area and the main area overlap each other, or any combination thereof.

Figure 4:
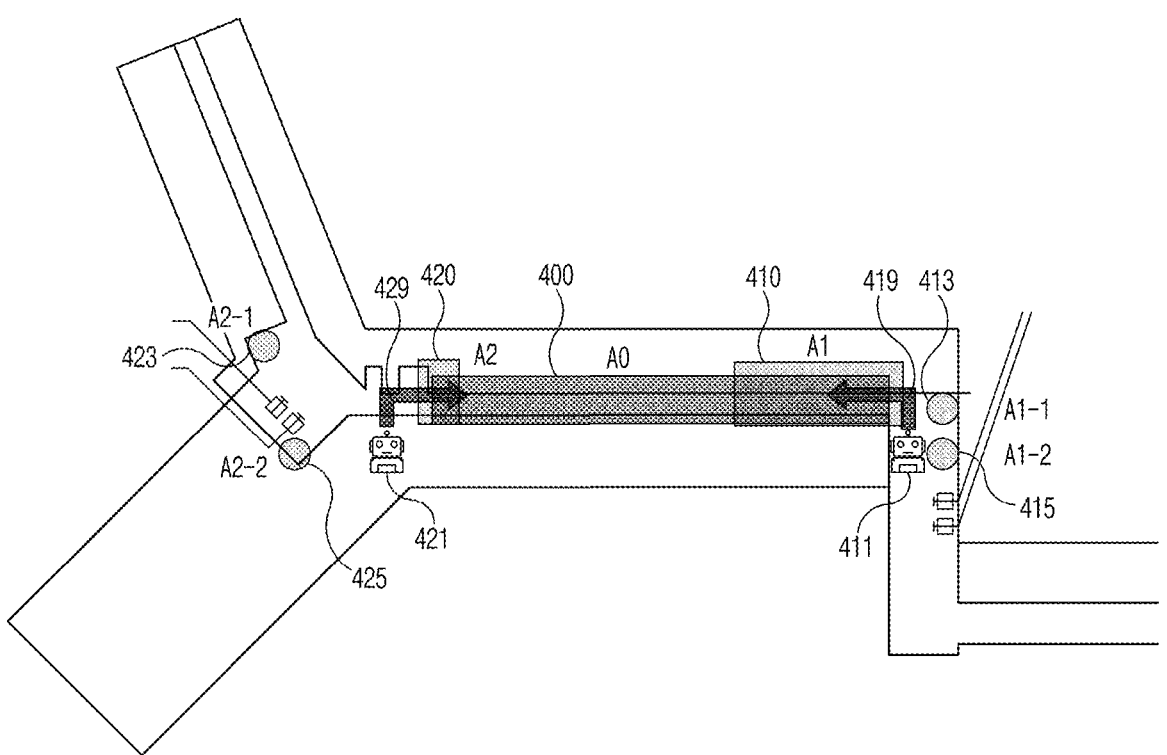
FIG. 4 is a diagram illustrating a plurality of example areas according to an embodiment of the present disclosure.

FIG. 4 is a diagram illustrating a plurality of example areas according to an embodiment of the present disclosure.

An electronic device (e.g., the electronic device 300 of FIG. 3) according to an embodiment may set a main area 400, a first sub area 410, a second sub area 420, and a standby area (e.g. a (1_1)-th standby area 413, a (1_2)-th standby area 415, a (2_1)-th standby area 423, and a (2_2)-th standby area 425). For example, the main area 400 may include a secondary area, in which deadlock between the plurality of robots may occur in the secondary area, in which the plurality of robots (e.g., a first robot 411 and a second robot 421) may move.

The sub area may include a partial area of the main area 400 and a partial area of a secondary area that is different from the main area 400 (e.g., a secondary area being some area other than the main area 400), and may include the first sub area 410 and the second sub area 420. The first sub area 410 may refer to a trigger area related to the main area 400 so that the entry direction of the first robot 411 may be recognized. The second sub area 420 may refer to another trigger area related to the main area 400 so that the entry direction of the second robot 421 may be recognized. In other words, the electronic device may determine a given entry condition to the main area 400 of a given robot, with reference to a time point, at which the robot enters a given sub area. In detail, the electronic device may determine the entry condition of the robot to the main area 400, with reference to a time point, at which the robot enters the sub area, which is precedent to the time point, at which the robot enters the main area 400.

The (1_1)-th standby area 413 and the (1_2)-th standby area 415 may refer to standby (or avoidance) areas of the first robot 411 for the first sub area 410. The (2_1)-th standby area 423 and the (2_2)-th standby area 425 may refer to standby (or avoidance) areas of the second robot 421 for the second sub area 420. Each of the main area 400, the first sub area 410, the second sub area 420, the (1_1)-th standby area 413, the (1_2)-th standby area 415, the (2_1)-th standby area 423, and the (2_2)-th standby area 425 may be set in the form of a polygon.

By way of example, the areas may be stored in a database as coordinates of a two-dimensional plane. The areas may be set through a user interface (UI), based on a user input. Based on the description of the above-mentioned areas, a detailed description of an operation of the electronic device (e.g., an operation of determining the entry condition of the first robot 411) will be described below.

The electronic device may set a sub area including a partial area of the main area 400 and a partial area of a secondary area that is different from the main area 400. In detail, the electronic device may set, among the sub areas, an area which the first robot 411 enters first while moving to the main area 400 as the first sub area 410, for example. The electronic device may set, among the sub areas, an area which the second robot 421 first enters while moving to the main area 400 as the second sub area 420, for example.

The electronic device may identify whether the second robot 421 is located in the main area 400, in response to the first robot 411 entering the first sub area 410. The electronic device may determine the first entry condition (e.g., a condition for causing the first robot 411 to move to the main area 400) to be inactive based on the second robot 421 being located in the main area and the number of robots that may move to the main area 400. The electronic device may move the first robot 411 to a standby area that is distinguished from the first sub area 410, the second sub area 420, and the main area 400, based on the first entry condition being determined to be inactive. In detail, the electronic device may move the first robot 411 to at least one of the (1_1)-th standby area 413 and the (1_2)-th standby area 415, for example. As an example, the electronic device may preferentially move the first robot 411 to the (1_1)-th standby area 413. The electronic device may cause the first robot 411 to move to the (1_2)-th standby area 415 if the number of robots included in the (1_1)-th standby area 413 is more than a set, selected, or predetermined number.

The electronic device may determine the number of robots located in the main area 400, based on the location of the second robot 421 in the first sub area 410 while the second robot 421 moves in a second direction 429. For example, the second robot 421 being located in the first sub area 410 may mean that the second robot 421 passes through the main area 400 and advances to a secondary area that is different from the main area 400. In detail, a first direction 419 can refer to a direction, in which the first robot 411 enters the first sub area 410, passes through the main area 400, and enters the second sub area 420. The second direction 429 may refer to a direction, in which the second robot 421 enters the second sub area 420, passes through the main area 400, and enters the first sub area 410. Accordingly, the first robot 411 entering the first sub area 410 may include that the first robot 411 enters the main area 400. The first robot 411 entering the second sub area 420 may include that the first robot 411 advances and/or passes through the main area 400. The second robot 421 entering the second sub area 420 may include that the second robot 421 enters the main area 400. The second robot 421 entering the first sub area 410 may include that the second robot 421 advances and/or passes through the main area 400.

The electronic device may determine the number of the robots located in the main area 400 if the second robot 421 advances and/or passes through the main area 400 (that is, if the second robot 421 enters the first sub area 410). The electronic device may determine the first entry condition to be active based on that the number of robots located in the main area 400 is the set, selected, or predetermined number of robots or less. That is, the electronic device may determine the first entry condition of the first robot 411 depending on the number of robots located in the main area 400 and the location of the second robot 421. For reference, a description of the operation of the electronic device (e.g., the operation of determining the entry condition of the first robot 411) is not limited thereto. For example, the operation of an electronic device may include the following operations.

The electronic device may determine a priority of the first robot 411 in the main area 400 based on at least one of the remaining battery charge of the first robot 411, the loading state of the first robot 411, the operation time period of the first robot 411, or any combination thereof. The electronic device may determine a priority of the second robot 421 in the main area 400 based on at least one of the remaining battery charge of the second robot 421, the loading state of the second robot 421, the operation time period of the second robot 421, or any combination thereof. The electronic device may determine the first entry condition based on comparison of the priority of the first robot 411 and the priority of the second robot 421. In other words, even if the first robot 411 enters the first sub area 410 while the second robot 421 is located in the main area 400, the electronic device may allow or enable entry (that is, enabling of the first entry condition) of the first robot 411 to the main area, through comparison of the priority of the first robot 411 and the priority of the second robot 421.

The electronic device may determine that the second entry condition that is a condition for causing the second robot 421 to enter the main area is inactive, based on the priority of the first robot 411 being higher than that of the second robot 421. The electronic device may move the second robot 421 to the standby area that is distinguished from the first sub area 410, the second sub area 420, and the standby area distinguished from the main area 400 based on the second entry condition of the second robot 421 being determined to be inactive. In detail, the electronic device may move the second robot 421 to at least one of the (2_1)-th standby area 423 and the (2_2)-th standby area 425, for example. As an example, the electronic device may preferentially move the second robot 421 to the (2_1)-th standby area 423. The electronic device may move the second robot 421 to the (2_2)-th standby area 425 if the number of robots included in the (2_1)-th standby area 423 is more than a set, selected, or predetermined number.

The electronic device may determine the number of robots located in the main area 400 based on the first robot 411 being located in an intersection area while moving in the first direction 419. For example, the intersection area may refer to an area of the sub area, which overlaps the main area 400. In other words, the sub area may include the intersection area and areas other than the intersection area. The electronic device may determine that the second entry condition of the second robot 421 is active, based on that the number of robots located in the main area 400 is the set, selected, or predetermined number of robots or less.

The electronic device may set, among the sub areas, the area excluding the partial area of the main area 400 as a padding area. For example, the padding area may be an area excluding the intersection area in the sub area. The electronic device may determine the priority of the first robot 411 and the priority of the second robot 421 based on that the first robot 411 has entered the intersection area and the second robot 421 has entered the padding area. The electronic device may determine the first entry condition based on comparison of the priority of the first robot 411 and the priority of the second robot 421.

Figure 5:
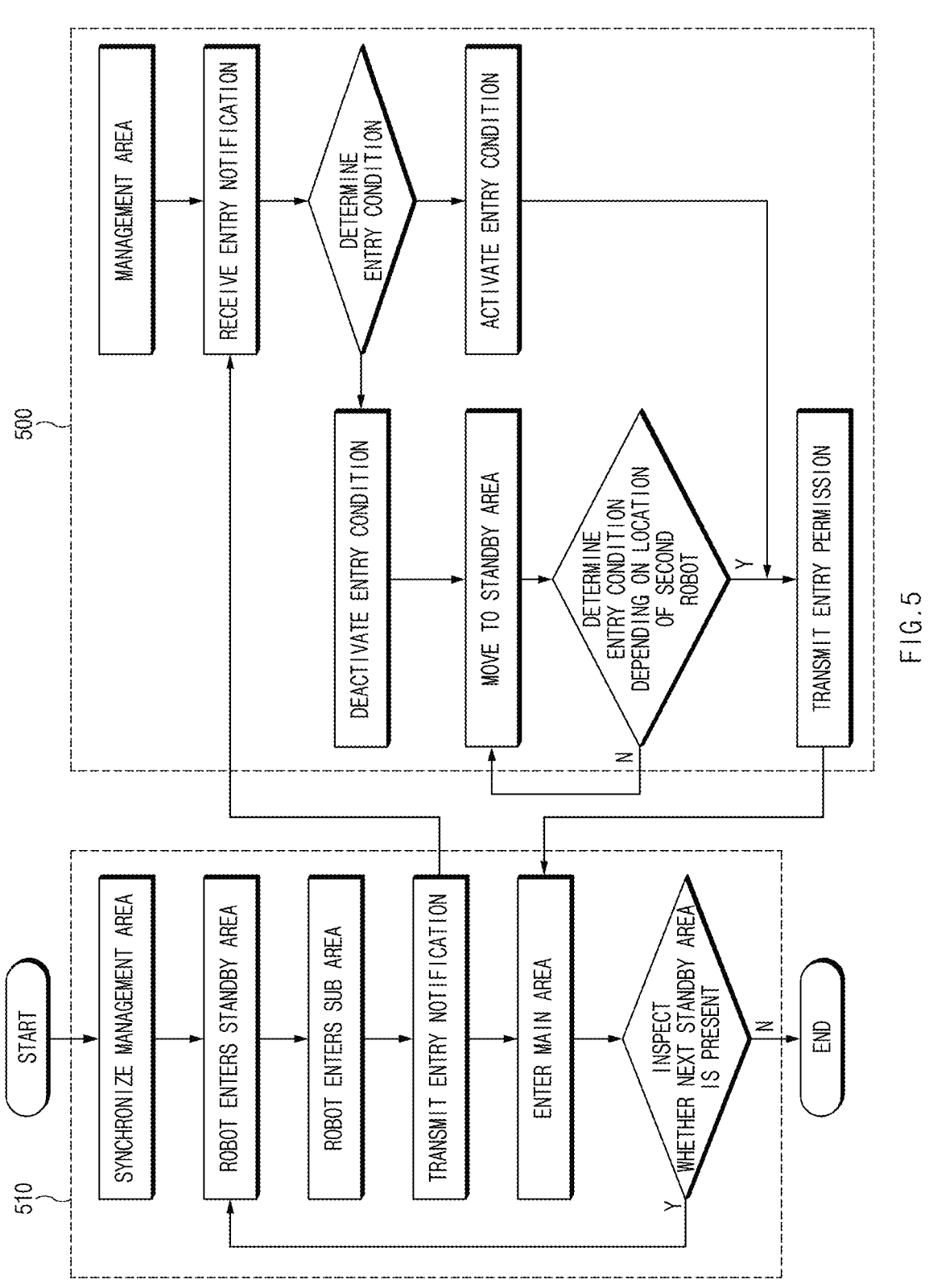
FIG. 5 is a flowchart illustrating a method for determining an entry condition to a main area of a robot in an electronic device according to an embodiment of the present disclosure.

FIG. 5 is a flowchart illustrating a method for determining an entry condition to a main area of a robot, in an electronic device according to an embodiment of the present disclosure.

An electronic device (e.g., the electronic device 300 of FIG. 3) according to an embodiment may determine an entry condition that is a condition for causing a robot (e.g., the first robot 310 or the second robot 320 of FIG. 3) to enter a main area. For example, in operation 500, the electronic device may transmit a permission regarding a request for entry into the main area of the robot, to the robot. In operation 510, the robot may transmit a request to enter the main area to the electronic device. Hereinafter, through operations 500 and 510, a description of example requests and responses of the electronic device and the robot will be described later.

In operation 510, the robot may synchronize management areas. For example, the management area may include the main area, the sub area, and the standby area, which are set by the electronic device. The robot may identify the management area through synchronization of the management area set by the electronic device.

The robot may enter the standby area based on the management area having been synchronized, in operation 510. The standby area may be an area, in which the robot stands by after entering the sub area, but it may also be an area, in which the robot stands by before entering the sub area. The robot may enter the sub area based on it having entered the standby area. The robot may transmit an entry notification to the electronic device based on it having entered the sub area after entering the standby area.

The electronic device may enable a management area service in operation 500. For example, the management area service may include a service that provides a management area to the robot. The electronic device may determine the entry condition (e.g., a first entry condition for the first robot and a second entry condition for the second robot) of the robot, based on it has received the entry notification from the robot. In detail, the electronic device may compare the priority of the robot that is located in the main area with the priority of the first robot, based on it having received the entry notification of the first robot. In the specification, for convenience of description, the first robot is a robot that transmits an entry notification to the electronic device and the second robot is a robot located in the main area at the time point, at which the first robot transmits an entry notification to the electronic device.

The electronic device may enable the entry condition of the first robot if the priority of the first robot is higher than that of the second robot. In contrast, the electronic device may disable the entry condition of the first robot if the priority of the first robot is lower than that of the second robot. Thereafter, the electronic device may move the robot to the standby area. The electronic device may determine the entry condition depending on the location of the second robot if the first robot moves to the standby area. The operations may be performed by the electronic device at a set, selected, or predetermined time interval. The electronic device may transmit an entry permission to the robot (e.g., the first robot in FIG. 5) based on the entry condition of the first robot having been enabled.

The robot may enter the main area based on that it has received the entry permission from the electronic device. The robot may enter the next standby area based on that it has identified the standby area after entering the main area.

Figure 6:
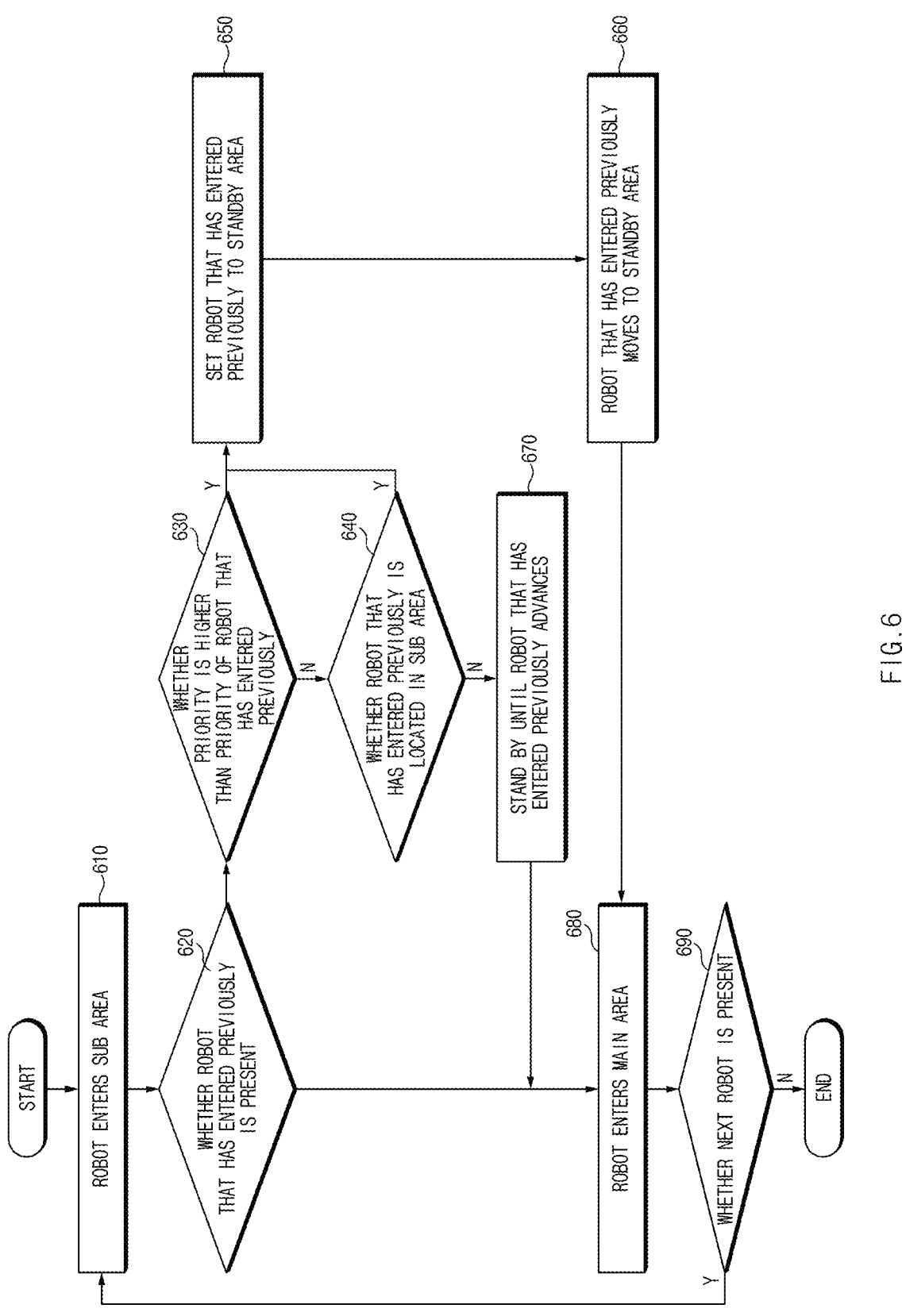
FIG. 6 is a flowchart illustrating a method for determining an entry condition through a comparison of priorities of a plurality of robots in an electronic device according to an embodiment of the present disclosure.

FIG. 6 is a flowchart illustrating a method for determining an entry condition through comparison of the priorities of the plurality of robots in an electronic device according to an embodiment of the present disclosure.

An electronic device (e.g., the electronic device 300 of FIG. 3) according to an embodiment may identify an entry of a first robot to a sub area in operation 610. The electronic device may determine that the first robot enters the main area based on that the first robot has entered the first sub area.

In operation 620, the electronic device may determine whether there is a second robot that has entered the main area previously. For example, if there is a second robot that has entered the main area previously, the electronic device may determine an entry condition of the first robot (e.g., the first robot that has entered the first sub area in operation 610) that has entered later to prevent deadlocks of robots in the main area.

In operation 630, the electronic device may compare the priority of the first robot that has entered later with the priority of the second robot that has entered first, based on that there is a second robot that has entered previously in the main area. The electronic device may set the standby area of the second robot that has entered previously in operation 650, based on that the priority of the first robot that has entered later is higher than the priority of the second robot that has entered previously. Thereafter, in operation 660, the electronic device may cause the second robot that has entered previously to the standby area.

In operation 640, the electronic device may determine whether the second robot that has entered previously is located in the first sub area, based on that the priority of the first robot that has entered later is lower than the priority of the second robot that has entered previously. The electronic device may perform operation 650 if the second robot that has entered previously is located in the first sub area. Unlike this, if the second robot that has entered previously is located in the main area rather than in the first sub area, in operation 670, the electronic device may cause the first robot that has entered later to stand by until the second robot that has entered previously advances (that is, until the second robot that has entered previously leaves the main area).

In operation 680, the electronic device may permit entry of the first robot to the main area, based on whether the second robot that has entered previously has advanced to the main area or the second robot that has entered previously has moved to the standby area. In other words, the electronic device may enable the entry condition of the first robot that has entered later.

In operation 690, the electronic device may determine whether there is a next robot (e.g., a third robot) in the standby area. The electronic device may perform operation 610 again if there is a next robot in the standby area.

FIG. 7 is a table illustrating an example of setting a main area by or in an electronic device according to an embodiment of the present disclosure.

FIG. 7 illustrates examples 700 of the main area. An electronic device (e.g., the electronic device 300 of FIG. 3) according to an embodiment may store examples 700 of the main area in a database. As illustrated in FIG. 7, the main area may be distinguished by at least one of an identification number (id), a name, a site identification number (site_id), the number of floor, the number of robots that may enter (max_robots), whether an entry is active, a location of sub area (triggers), a generation time (created_at), an update time (updated_at), or any combination thereof.

By way of example, referring to FIG. 7, examples 700 of the main area may include four main areas. Among the four main areas, a first main area may refer to a central hallway on the fifth floor. However, in the specification, the examples 700 of main areas are described as illustrated in FIG. 7 for convenience of description, but the present disclosure is not limited thereto.

FIG. 8 is a diagram illustrating an interface that is provided to a user by an electronic device according to an embodiment of the present disclosure.

An electronic device (e.g., the electronic device 300 in FIG. 3) according to an embodiment may set the main area based on a user input that is received through the communication device. The user may transmit an input for setting the main area through a user interface that is provided by the electronic device. By way of example, the above-described user interface may be as illustrated in FIG. 8. The electronic device may provide a list of the main areas to the user through the communication device. The user may select a target main area from the list of main areas provided by the electronic device.

The electronic device may provide a setting screen for modifying detailed setting values of the target main area, based on that it has received a selection of the target main area from the user. Through the setting screen provided by the electronic device, the user may input at least one of an identification number of the target main area, a location name of the target main area, the number of robots allowed in the target main area, the number of floor of the target main area, or a location of the standby area related to the target main area, or any combination thereof.

Figure 9:
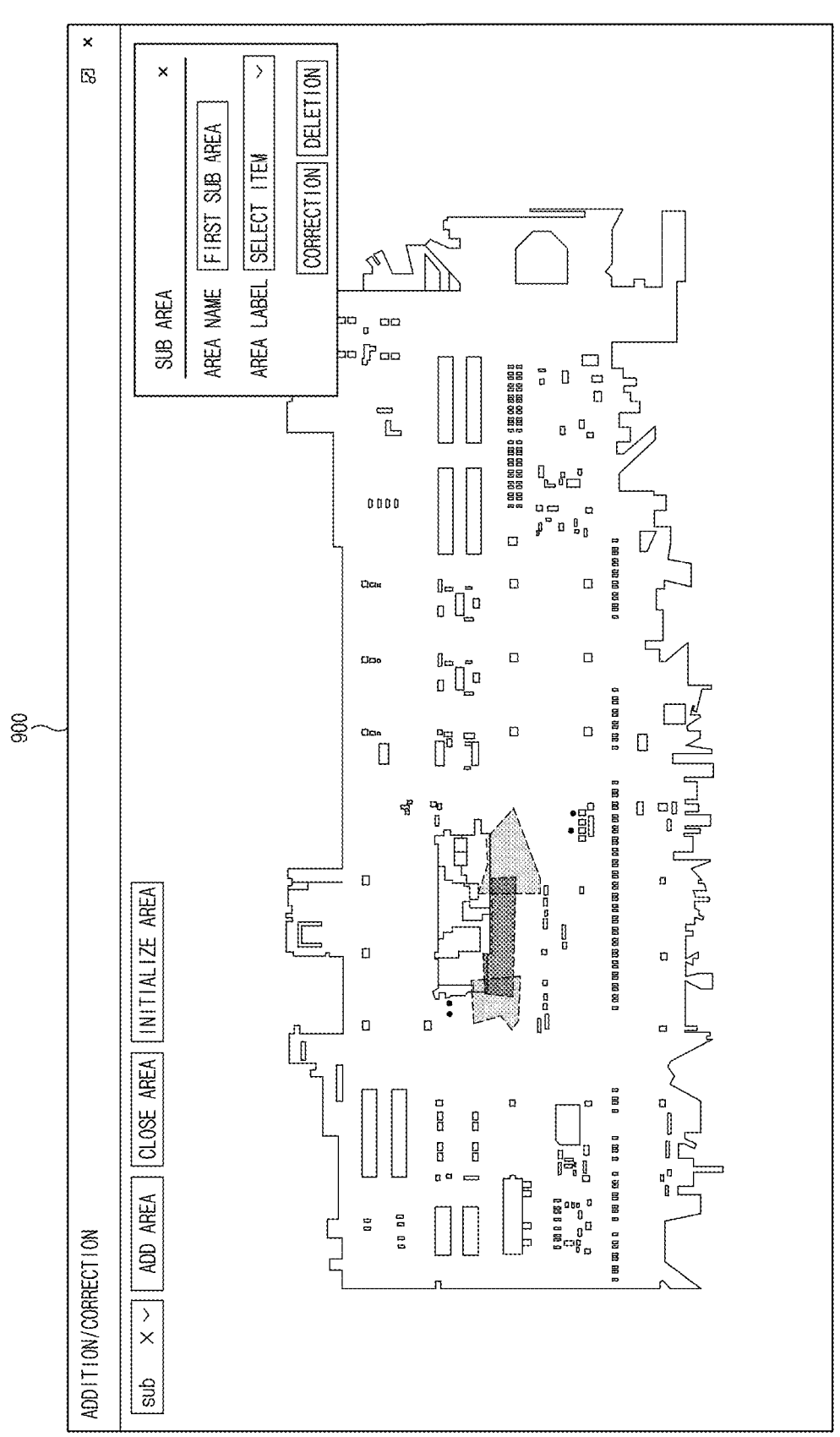
FIG. 9 is a diagram illustrating an interface for setting a sub area in an electronic device according to an embodiment of the present disclosure.

FIG. 9 is a diagram illustrating an interface for setting a sub area in an electronic device according to an embodiment of the present disclosure.

An electronic device (e.g., the electronic device 300 in FIG. 3) according to an embodiment may set a sub area based on a user input that is received through the communication device. The user may transmit an input for setting the sub area through a user interface that is provided by the electronic device. By way of example, the above-described user interface may be as illustrated in FIG. 8. The electronic device may provide a setting screen for the sub area to the user through the communication device. The user may change the setting of the sub area through a sub area setting screen that is provided by the electronic device.

By way of example, the electronic device may provide the user with at least one of addition of a sub area, ending of a sub area, initialization of a sub area, or a sub area selection window, or any combination thereof. The user may change the setting of the sub area related to the main area through items (e.g., addition of a sub area) that are provided by the electronic device. The user may determine at least one of the number of robots that need to move in the main area, a policy setting for preventing a deadlock in the main area, or a policy setting for robots to enter the main area, or any combination thereof, by inputting the setting of the sub area.

Figure 10:
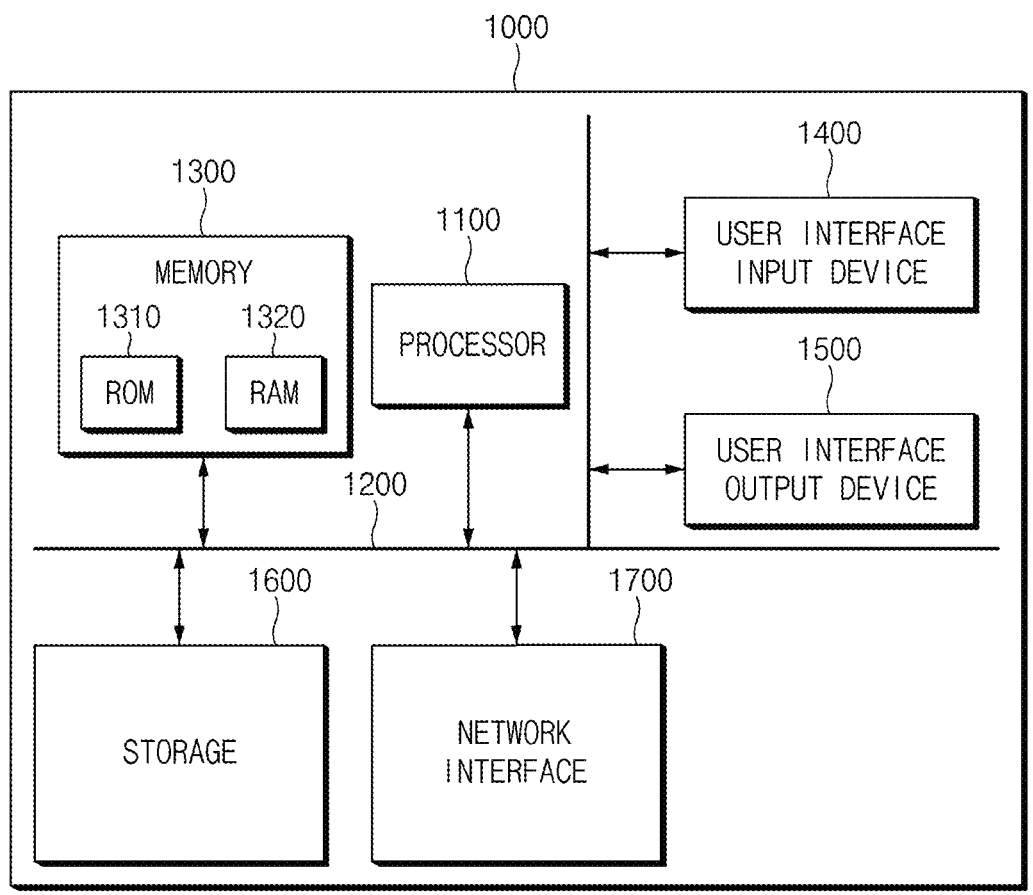
FIG. 10 is a diagram illustrating a computing system related to an electronic device or a control method according to an embodiment of the present disclosure.

FIG. 10 is a diagram illustrating a computing system related to an electronic device or a control method according to an embodiment of the present disclosure.

Referring to FIG. 10, a computing system 1000 related to the electronic device or the control method may include at least one processor 1100, a memory 1300, a user interface input device 1400, a user interface output device 1500, a storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in the memory 1300 and/or the storage 1600. A storage medium may include the memory 1300 and the storage 1600, which may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a RAM memory, a flash memory, a ROM memory, an EPROM memory, an EEPROM memory, a register, a hard disk, a removable disk, a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above explanation is merely an illustrative explanation of technical ideas of the present disclosure, and those skilled in the art in the technical fields to which the present disclosure pertains may make various modifications and variations without departing from the spirit of the present disclosure.

Some embodiments described above may be implemented with hardware components, software components, and/or a combination of hardware components and software components. For example, the devices, methods, and components described in an embodiment, for example, may be implemented by using a general-purpose computer or a special-purpose computer, such as, a processor, a controller, an arithmetic logic unit (ALU), a digital signal processor, a microcomputer, and a field programmable gate array (FPGA), a programmable logic unit (PLU), a microprocessor, or any other device capable of executing and responding to instructions. The processing device may execute an operating system (OS) and software applications running on the operating system. Additionally, the processing device may access, store, manipulate, process, and generate data in response to execution of software. For ease of understanding, a single processing device may be described as being used; however, those skilled in the art will understand that a processing device includes multiple processing elements and/or multiple types of processing elements. For example, the processing device may include multiple processors or one processor and one controller. Furthermore, other processing configurations, such as parallel processors or distributed processors, are possible.

Software may include a computer program, code, instructions, or a combination of one or more of these, which may configure a processing device to operate as desired, or may be processed independently or collectively. Software and/or data may be embodied permanently or temporarily in any type of machine, component, physical device, virtual equipment, computer storage medium or device, or a transmitted signal wave to be interpreted by the processing device or provide commands or data to the processing device. Software may be distributed over networked computer systems and stored or executed in a distributed and/or decentralized manner. Software and data may be stored on one or more computer-readable recording mediums.

A method according to an embodiment may be implemented in a form of program instructions that may be executed through various computer systems and recorded on one or more computer readable mediums. The computer readable medium, may be singular or may include a plurality of components together, distributed, or decentralized, and may include program instructions, data files, data structures, and the like, singly or in combination. The program instructions recorded on the medium may be specially designed and constructed for an embodiment or may be known and available to those skilled in the art of computer software. Examples of computer readable recording media may include hardware devices specifically configured to store and execute program instructions, magnetic media, such as hard disks, floppy disks, and magnetic tapes, optical media, such as CD-ROMs and DVDs, and magnetic media, such as floptical disks, ROM, RAM, flash memory, and the like. Examples of program instructions may include machine language code, such as that produced by a compiler, as well as high-level language code that may be executed by a computer by using an interpreter.

Hardware devices described above may be configured to operate as one or a plurality of software modules to perform the operations of the embodiments, and vice versa.

Some advantages of an electronic device and an control method according to an embodiment of the present disclosure will be described as follows.

According to at least one of the embodiments of the present disclosure, a sub area including a partial area of a main area, in which a deadlock occurs in an area, in which a first robot that moves in a first direction and a second robot that moves in a second direction that is different from the first direction may move may be set whereby a deadlock may be prevented in the main area while entries of the robots are adjusted if the plurality of robots are located in the sub area even if the plurality of robots are located in the main area.

Furthermore, according to at least one of the embodiments of the present disclosure, a first entry condition that is a condition for causing a first robot to enter the main area with respect to a location of a second robot based on that the first robot has entered a sub area may be determined whereby the entry condition may be determined in detail depending on an entry direction of the robot and a safety and a convenience of a pedestrian may be secured by causing the robot to move to a preset safe standby area.

Furthermore, according to at least one of the embodiments of the present disclosure, a request of a first robot and a request of a second robot may be received through a communication device that performs a data conversion function and a main area and a sub area are set through a user input whereby data of robots that perform various types of services may be received and an entry sequence of the robots to the main area may be determined through an interaction with the user.

In addition, various advantages directly or indirectly recognized through this document may be provided.

As described above, although the example embodiments have been described with limited drawings, those skilled in the art may apply various technical modifications and variations based on this. For example, the described techniques can be performed in an order different from the described method, and/or adequate results may be achieved even though components of the described system, the structure, the device, the circuit, and the like, can be coupled or combined in a form that is different from the described method, or they can be replaced or substituted by other components or equivalents.

Therefore, other implementations, other embodiments, and equivalents to the claims also can fall within the scope of the claims described below.

Therefore, the example embodiments of the present disclosure are provided to explain the spirit and scope of the present disclosure, but not to limit them, so that the spirit and scope of the present disclosure is not necessarily limited by the example embodiments. The scope of the present disclosure can be construed on the basis of the accompanying claims, and all technical ideas within the scope equivalent to the claims can be included in the scope of the present disclosure.

What is claimed is:

1. An electronic device comprising:
a communication device configured to support communication between the electronic device and an external device;
one or more processors; and
a storage medium storing computer-readable instructions that, when executed by the one or more processors, enable the one or more processors to:
set a first sub area in which a first robot is movable in a first direction and in which a second robot is movable in a second direction, the second direction being different from the first direction, wherein the first sub area includes a first partial area of a main area, wherein the first sub area is a trigger area for determining a first entry condition that indicates whether the first robot is permitted to enter into the main area;
in response to the first robot entering the first sub area, determine a first entry condition that indicates whether the first robot is permitted to enter the main area, based on a location of the second robot, wherein the main area is where a deadlock of the first robot and the second robot can occur; and
transmit, to the first robot and based on the first entry condition being determined, a first entry command for causing the first robot to enter the main area.

2. The electronic device of claim 1, wherein the instructions further enable the one or more processors to:
set the first sub area in which the first robot enters the main area first while moving to the main area, wherein the first sub area includes the first partial area of the main area and includes a second partial area of a second area, the second area being different from the main area; and
set a second sub area in which the second robot enters the main area first while moving to the main area.

3. The electronic device of claim 2, wherein the instructions further enable the one or more processors to:
identify whether the second robot is located in the main area, in response to the first robot having entered the first sub area; and
determine the first entry condition as being inactive based on the second robot being located in the main area and based on a total number of robots being movable to the main area.

4. The electronic device of claim 3, wherein the instructions further enable the one or more processors to:
move the first robot to a first standby area being distinguished from the first sub area, the second sub area, and the main area, based on the first entry condition being determined as being inactive.

5. The electronic device of claim 4, wherein the instructions further enable the one or more processors to:
determine a first number of total robots located in the main area, based on the second robot being located in the first sub area while moving in the second direction; and
determine the first entry condition as being active, based on the first number of the total robots being located in the main area being equal to or less than a threshold number of the total robots.

6. The electronic device of claim 3, wherein the instructions further enable the one or more processors to:
determine a first priority of the first robot and a second priority of the second robot based on the second robot being located in an intersection area of the second sub area being a second partial area of the main area in response to the second robot moving in the second direction.

7. The electronic device of claim 6, wherein the instructions further enable the one or more processors to:

determine the first priority of the first robot in the main area based on one or more of a first remaining battery charge of the first robot, a first loading state of the first robot, and a first operation time period of the first robot;

determine the second priority of the second robot in the main area based on one or more of a second remaining battery charge of the second robot, a second loading state of the second robot, and a second operation time period of the second robot; and determine the first entry condition based on comparing the first priority of the first robot and the second priority of the second robot.

8. The electronic device of claim 7, wherein the instructions further enable the one or more processors to:

determine a second entry condition for whether to permit the second robot to enter the main area as being inactive, based on the first priority of the first robot being higher than the second priority of the second robot;

move the second robot to a second standby area distinguished from the first sub area, the second sub area, and the main area, based on the second entry condition being determined as being inactive;

determine a first number of total robots located in the main area, based on the first robot being located in an intersection area while moving in the first direction; and determine the second entry condition as being active, based on the first number of the total robots being located in the main area being equal to or less than a threshold number of the total robots.

9. The electronic device of claim 1, wherein the instructions further enable the one or more processors to:

set an intersection area of the first sub area being a first partial area of the main area;

set a second area of the first sub area, other than the first partial area of the main area, as a padding area;

determine a first priority of the first robot and a second priority of the second robot, based on the first robot having entered the intersection area and the second robot having entered the padding area; and determine the first entry condition based on comparing the first priority of the first robot and the second priority of the second robot.

10. The electronic device of claim 1, wherein the instructions further enable the one or more processors to:

receive a first request from the first robot and a second request from the second robot, through the communication device, wherein the communication device is configured to perform a data transform function;

determine the first direction and the second direction based on area locations of the main area and the first sub area, and based on robot locations of the first robot and the second robot; and set the main area and the first sub area based on a user input received through the communication device.

11. A control method comprising:

setting a first sub area in which a first robot is movable in a first direction and in which a second robot is movable in a second direction, the second direction being different from the first direction, wherein the first sub area includes a first partial area of a main area, wherein the first sub area is a trigger area for determining a first entry condition that indicates whether the first robot is permitted to enter into the main area;

in response to the first robot entering the first sub area, determining a first entry condition that indicates whether the first robot is permitted to enter the main area, based on a location of the second robot, wherein the main area is where a deadlock of the first robot and the second robot can occur; and transmitting, to the first robot and based on the first entry condition being determined, a first entry command for causing the first robot to enter the main area.

12. The control method of claim 11, further comprising:

setting the first sub area in which the first robot enters the main area first while moving to the main area, wherein the first sub area includes the first partial area of the main area and includes a second partial area of a second area, the second area being different from the main area; and setting a second sub area in which the second robot enters the main area first while moving to the main area.

13. The control method of claim 12, further comprising:

identifying whether the second robot is located in the main area, in response to the first robot having entered the first sub area; and determining the first entry condition as being inactive based on the second robot being located in the main area and based on a total number of robots being movable to the main area.

14. The control method of claim 13, further comprising:

moving the first robot to a first standby area being distinguished from the first sub area, the second sub area, and the main area, based on the first entry condition being determined as being inactive.

15. The control method of claim 13, further comprising:

determining a first number of total robots located in the main area, based on the second robot being located in the first sub area while moving in the second direction; and determining the first entry condition as being active, based on the first number of the total robots being located in the main area being equal to or less than a threshold number of the total robots.

16. The control method of claim 13, further comprising:

determining a first priority of the first robot and a second priority of the second robot based on the second robot being located in an intersection area of the second sub area being a second partial area of the main area in response to the second robot moving in the second direction.

17. The control method of claim 16, further comprising:

determining the first priority of the first robot in the main area based on one or more of a first remaining battery charge of the first robot, a first loading state of the first robot, and a first operation time period of the first robot;

determining the second priority of the second robot in the main area based on one or more of a second remaining battery charge of the second robot, a second loading state of the second robot, and a second operation time period of the second robot; and determining the first entry condition based on comparing the first priority of the first robot and the second priority of the second robot.

18. The control method of claim 17, further comprising:

determining a second entry condition for whether to permit the second robot to enter the main area as being inactive, based on the first priority of the first robot being higher than the second priority of the second robot;

moving the second robot to a second standby area distinguished from the first sub area, the second sub area, and the main area, based on the second entry condition being determined as being inactive;

determining a first number of total robots located in the main area, based on the first robot being located in the intersection area while moving in the first direction; and determining the second entry condition as being active, based on the first number of the total robots being located in the main area being equal to or less than a threshold number of the total robots.

19. The control method of claim 11, further comprising:

setting an intersection area of the first sub area being a first partial area of the main area;

setting a second area of the first sub area, other than the first partial area of the main area, as a padding area;

determining a first priority of the first robot and a second priority of the second robot, based on the first robot having entered the intersection area and the second robot having entered the padding area; and determining the first entry condition based on comparing the first priority of the first robot and the second priority of the second robot.

20. A control method comprising:

receiving a first request from a first robot and a second request from a second robot;

determining a first direction and a second direction based on area locations of a main area and a first sub area, and based on robot locations of the first robot and the second robot, wherein the second direction is different from the first direction;

setting the main area and the first sub area based on a user input;

setting the first sub area in which the first robot is movable in the first direction and in which the second robot is movable in the second direction, wherein the first sub area includes a first partial area of the main area, wherein the first sub area is a trigger area for determining a first entry condition that indicates whether the first robot is permitted to enter into the main area;

in response to the first robot entering the first sub area, determining a first entry condition that indicates whether the first robot is permitted to enter the main area, based on a location of the second robot, wherein the main area is where a deadlock of the first robot and the second robot can occur; and transmitting, to the first robot and based on the first entry condition being determined, a first entry command for causing the first robot to enter the main area.

* * * * *